Corn Harvester.

No. 89,979.  Patented May 11, 1869.

Witnesses
Charles Williams
A. Ruppert

Inventors
L. H. Fisher
C. Holcomb
D. P. Holloway & Co.
Attys

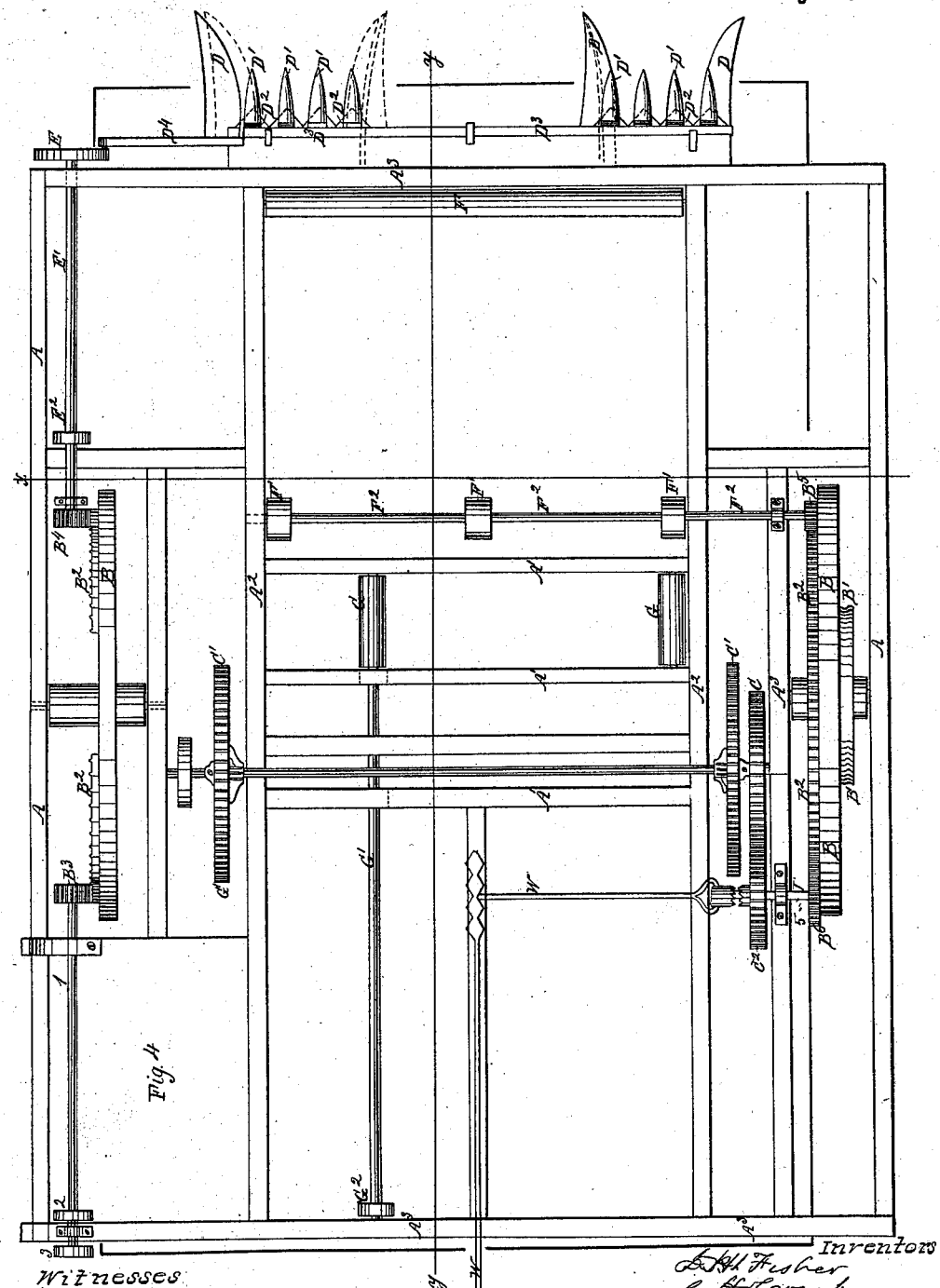

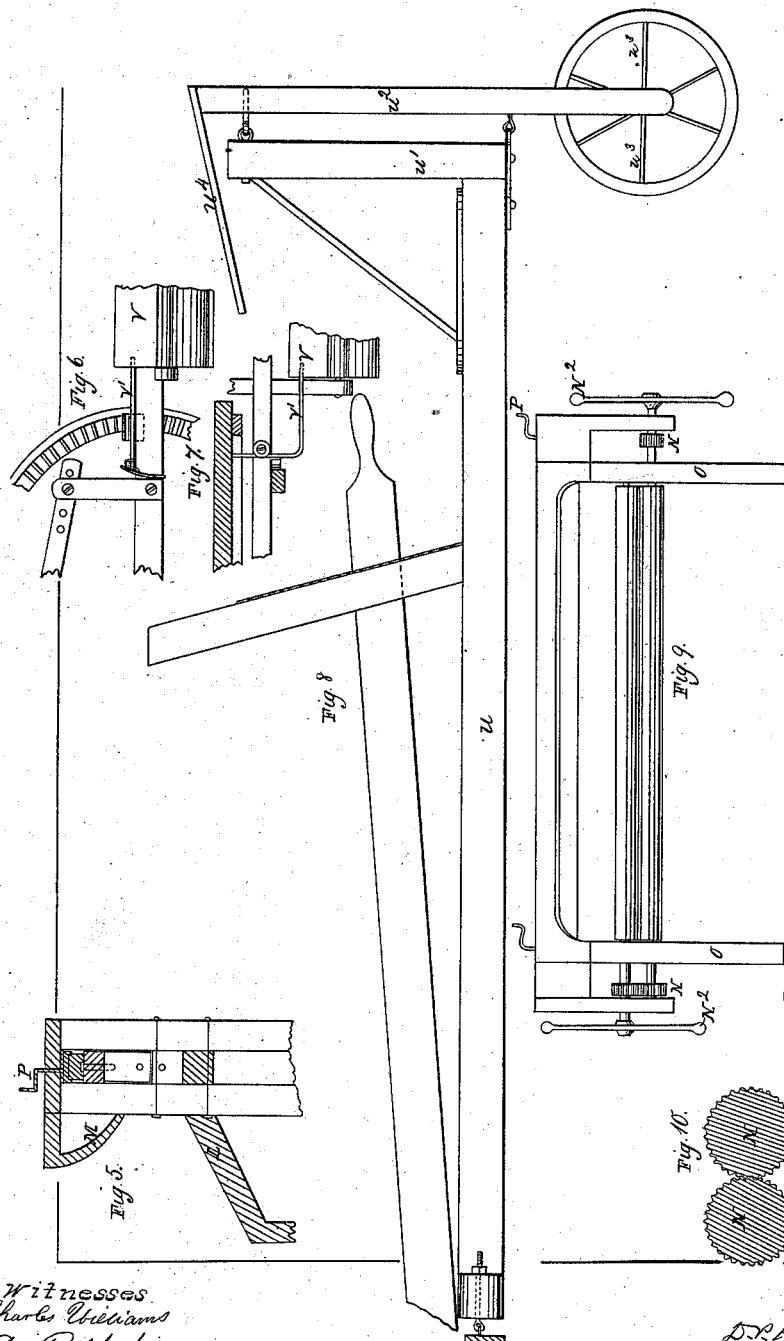

FISHER & HOLCOMB.
Corn Harvester.
4 Sheets—Sheet 4.
No. 89,979.
Patented May 11, 1869.
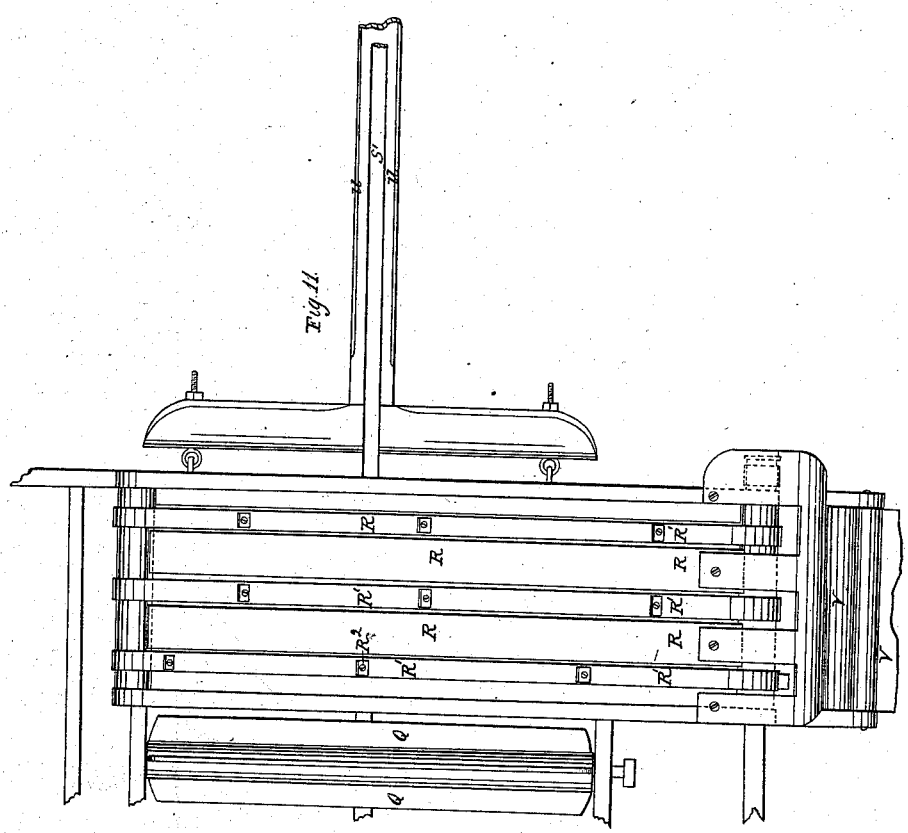

United States Patent Office.

JAMES H. FISHER AND CHARLES HOLCOMB, OF MENDOTA, ILLINOIS.

Letters Patent No. 89,979, dated May 11, 1869.

---

IMPROVEMENT IN CORN-HARVESTERS.

---

The Schedule referred to in these Letters Patent and making part of the same.

---

*To all whom it may concern:*

Be it known that we, JAMES H. FISHER and CHARLES HOLCOMB, of Mendota, in the county of La Salle, and State of Illinois, have invented a new and useful Improvement in Corn-Harvesters; and do hereby declare that the following is a full, clear, and exact description of the same, reference being had to the annexed drawings, making part of this specification, in which—

Figure 4 is a plan view of the frame of the machine, showing, also, how the gears and shifting to which they are attached are arranged.

Figure 5 is an enlarged view of the frame in which the husking-rollers are placed.

Figure 6 is a side elevation, and

Figure 2:
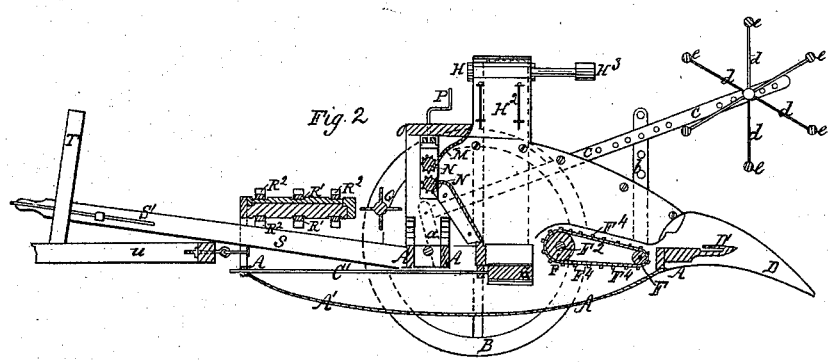
Figure 2 is a longitudinal vertical section on the line $y\ y$ of fig. 4, showing the arrangement of the various parts.

Figure 7, a plan view of the arm which operates the wheel which receives the stalks from the apron, and deposits them upon the ground.

Figure 8 is a side elevation of the rear part of the machine, showing the lever by which the cutters are raised and lowered, and the wheel by which the direction of the machine is controlled.

Figure 9 is a front view of the husking-rollers and their fastenings, showing, also, the balanced wheels upon the ends of their shafts.

Figure 10 is a transverse section of the husking-rollers.

Figure 11 is a top view of the endless apron upon which the stalks are delivered after having been husked.

Corresponding letters refer to corresponding parts in the several figures.

This invention relates to that class of machines which is designed to cut and husk corn; and It consists in the construction, combination, and arrangement of the parts comprising such machine, as will be fully described hereinafter.

A A, in the drawings, represent the frame-work of the machine, which is to be made of wood, and have the necessary cross-beams, $A^1$, $A^2$, and $A^3$, for the support of the different parts of the machinery, as shown in fig. 4.

B B represent the driving-wheels of the machine, which may be constructed similar to the wheels of an ordinary wagon, they having hubs, felloes, and spokes, as in such wheels, the felloes to be shod with an iron tire, and the wheels to be secured to an iron shaft, which extends from that portion of the frame marked A to the portion $A^3$, and has iron bearings in suitable boxes secured to the sides A $A^3$ of the frame.

Just within the felloes of these wheels there is to be attached to the spokes a bevelled wheel, or segments of gearing, which shall constitute a driving-gear, for driving the various parts of the machine, hereafter to be described.

$B^1$ represents a chain-pulley, which is to be secured to the shaft, outside of one of the driving-wheels, and is to have its periphery serrated, or so constructed as to receive the links of a chain which passes around it, for the purpose of driving the reel which gathers the corn in, and helps to carry it to the cutters.

$B^2$ represents the gear-wheels, which are to be attached to the driving-wheel, and which mesh into and drive the pinions $B^3$, $B^4$, $B^5$, and $B^6$.

The pinion $B^3$, being upon that side of the machine which has its driving-gear upon the outside of the driving-wheel, is for the purpose of driving the shaft 1, to which the pulleys 2 and 3 are secured, and which drive the shaft 4, upon which is a drum, over which the belts R' pass, for the purpose of carrying the stalks to wheel V, which deposits them upon the ground.

The pinion $B^4$, which meshes into the same driving-wheel as does $B^3$, but at a point opposite to it, is for the purpose of driving the shaft $E^1$, to which the rod leading to and moving the cutters is attached.

The pinion $B^5$, being upon the side of the machine opposite to those last described, and meshing into the periphery of the driving-gear upon that side of the machine, or into cogs formed upon such periphery, is for the purpose of driving the shaft $F^2$, to one end of which it is to be secured, while the pinion $B^6$ is arranged upon the opposite side of the same driving-gear, and is for the purpose of driving the husking-rollers.

C represents a spur-gear, which is to be secured to that end of shaft 4 which is nearest to the driving-gear $B^2$, such shaft having its bearings in the beams $A^2$ $A^2$ of the main frame.

C $C^1$ represent spur-gear wheels, which are to be secured to the shaft 4 near its ends, they being so arranged as to mesh into pinions upon the outer ends of the lower husking-roller, N.

$C^2$ represents a spur-wheel, which is mounted upon shaft 5, which has its bearings in that portion of the frame designated by $A^2$ and $A^3$, it being for the purpose of driving the wheel C.

Upon the shaft of wheel $C^2$ there is a clutch-coupling, for the purpose of throwing such wheels into and out of gear with the driving-wheel.

D D represent guards or gatherers, which are to be secured to the front of the main frame, or to an apron attached thereto.

Figure 1:
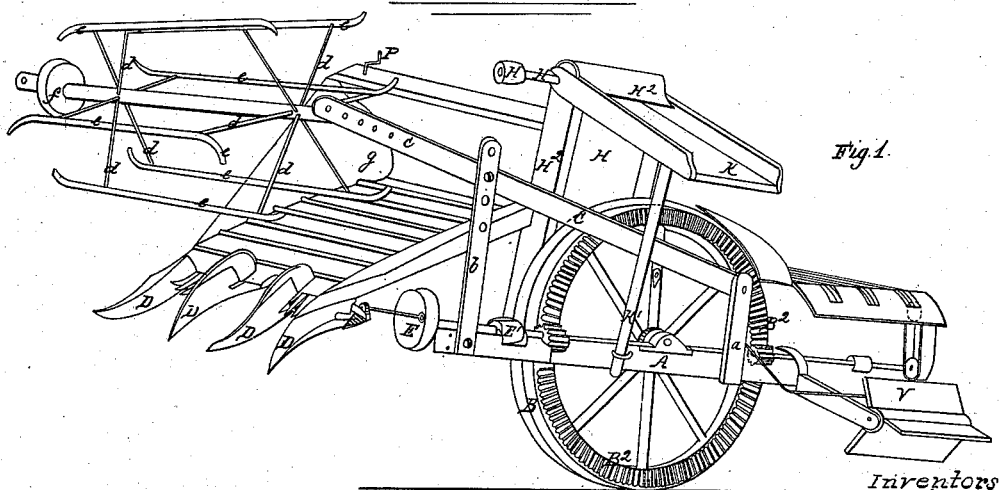
Figure 1 is a perspective view of our improved machine.

These gatherers are to be constructed substantially as represented in figs. 1 and 4, and so arranged as to pass upon each side of two rows of the standing corn, and gather them, or any stalks of them which may be somewhat separated from the others, inward, and guide them directly to the cutters, which are to be arranged between them.

$D^1$ $D^1$ represent fingers or guards, which are to be secured to a bar of metal or wood, which is to be attached to the front end of the machine, they being so constructed that the cutter-bar can slide freely in the slots formed therein, in which respect they resemble the finger-guards in use on harvesting-machines generally.

D² D² represent the cutters, which may be of any approved form of construction, they being arranged upon the bar D³ in groups, so as to bring them between the guides D D.

D³ represents the bar to which the cutters are to be attached, it being held in position by suitable bearings, through which it slides, such bearings being secured to the frame-work of the machine, or to some attachment thereto.

D⁴ represents a connecting-rod, one end of which is secured to the end of the cutter-bar, while its opposite end is to be attached to a crank-pin in the wheel E, which causes it to give the required movement to said cutter-bar.

E represents a disk-wheel, which is to be secured to the outer end of shaft E¹, and is to have a crank-pin inserted into it, at such a distance from its centre as to give the required amount of motion to the cutters.

E¹ represents a shaft, which is to be arranged in bearings resting upon the main frame, as in fig. 4, and is to have secured to it the pulley E², in such a position as to drive or be in line with the pulley H³, upon the shaft of elevator H.

This shaft, and the pulleys and crank attached thereto, are to be driven by the pinion B⁴, upon the end of the shaft, as above described.

F¹ represents an endless belt or apron, which is to be arranged near the front end of the machine, and just in the rear of the cutters, so that, as the corn is cut, the stalks, or those portions of them which have been cut off, will fall upon such apron, and be by it carried toward and deposited upon the incline L, which guides them to the husking-rollers.

This apron has, upon its outer surface, cleats, F⁴, for the purpose of aiding in the movement of the stalks. It passes over a small pulley, F¹, at one point, which pulley is secured to shaft F², while at another point it passes around a pulley or roller, F, upon shaft F, by which former shaft and pulley this belt is driven.

G represents a pulley or drum, which is to be secured to the shaft G¹, which shaft is arranged in bearings in the main frame, and has, upon its outer end, a pulley, G², which is in line with and is driven by pulley 2 on shaft 1.

G³ represents an endless belt or apron, which passes around the pulley or drum G upon shaft G¹, and around a corresponding pulley, arranged as shown in fig. 4.

This apron is provided with cleats or projections upon its outer surface, for the purpose of carrying forward the ears of the corn after they have been husked, and depositing them in the elevator H.

H H represent the shafts of the elevator, they being arranged at a right angle to the driving-shaft of the machine, the upper one being driven by means of a pulley, H³, upon its outer end, over which a belt passes from the pulley E², which is secured to the shaft E¹.

Figure 3:
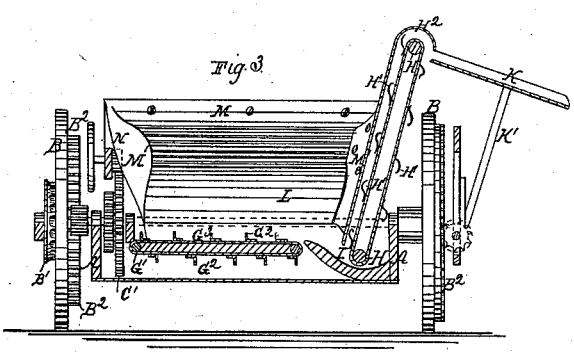
Figure 3 is a transverse vertical section on line $x\ x$ of fig. 4, showing the arrangement of the driving-gears and the elevators for carrying away the ears of corn after they have been husked.

H² represents a casing for the elevator-belt to run in, while H¹ represents cleats secured to the belt or apron of the elevator, they being so constructed as to receive the ears of corn from the apron or belt G³, and elevate them into the hopper or spout K, as shown clearly in fig. 3.

I represents a receptacle for the ears of corn, into which they are delivered by the belt or apron G³, and from which they are taken by the elevator, and carried up and deposited in spout K.

This receptacle is to be constructed as shown in fig. 3, it having the concave interior surface there shown, and it being so arranged, with reference to the elevator, that the projections formed thereon shall take up therefrom the ears of corn, and carry them to their proper place.

K represents a spout or chute, which is to be attached to the upper end of the elevator-case, and so arranged that it will receive the ears of corn from such elevator, and deposit them in a wagon or cart, which may be driven along by the side of the machine; or the ears may be allowed to fall into any other receptacle provided for their reception; or they may be deposited upon the ground, and afterward gathered up and placed in a wagon or cart.

L represents an inclined plane, of which there are two, one arranged in the rear of the other, but at a distance from each other sufficient to permit ears of corn to pass down between them.

The outer one of these planes is so arranged, that its lowest part comes nearly in contact with the inner edge of the endless belt or apron F¹, and is designed to receive the stalks of corn from such apron, and conduct them to the husking-rollers.

The object in providing two of these planes is to provide a passage between them for the passage of the ears of corn (after they have been husked) to the apron G³, they being so arranged, however, that such ears may pass down through such space; or they may pass down upon the outer surface of the outer plane, and be deposited upon the same apron, which change of direction the ears of corn will sometimes take in practice.

M represents an inclined plane, which is arranged above those already described, but so as to have an inclination the reverse of them, it being designed to assist in guiding the corn to the husking-rollers. The form and arrangement of this plane are clearly shown in figs. 2 and 3.

N N represent the husking-rollers, which are to have their peripheries fluted or corrugated, as shown in fig. 10, so that, as the ears of the corn are presented to their surfaces, the husks thereon will be stripped off, and carried between such rollers, while the ears of corn will fall down through the spaces provided therefor, as before described.

These rollers may be three inches in diameter, or more or less than that, and of a length sufficient to extend across the machine, or so far across it as to receive the length of the stalks that are cut off, and that are to be passed between such rollers.

The combination of these fluted rollers with a corn-husking machine is regarded as of great importance, as it is believed that they possess advantages in that connection greater than any other form of rollers.

N² represents fly or balance-wheels, which are to be placed upon the outer ends of the shafts of the husking-rollers, for the purpose of regulating the motion of such rollers.

O represents a standard, or frame, in which there are to be placed sliding boxes, for the reception of the journals of the husking-rollers, they being so arranged as to be capable of adjustment vertically, in the jambs of the frame.

Between the journal of the upper one of these rollers and the cap, which extends across the upper ends of the jambs of the frame in which they rotate, there is to be placed a rubber, or other spring, which is for the purpose of allowing the space between the rollers to be increased when occasion requires. If found necessary, a similar spring may be placed below the lower roller, and for a similar purpose.

P represents a screw, which is provided with a handle upon its upper end, it being for the purpose of setting the husking-rollers, in reference to their proximity to each other.

Q represents a wheel, or spider, consisting of a shaft, having four projecting arms, which radiate from the shaft in opposite directions.

This wheel is arranged directly in the rear of the husking-rollers, and is designed to receive the stalks from such rollers, and transfer them to the apron R.

R represents the frame-work of an endless apron or belt, which is to be arranged transversely to the length of the husking-rollers, and immediately in the rear of the wheel Q, from which it receives the stalks, and carries them to the depositing-wheel V, shown in fig. 1.

R¹ represents a series of belts, which compose this endless apron, and which pass over rollers at each end of the frame-work thereof, and are driven by a pulley, on the shaft 1.

R² represents cleats, or cross-bars, which are to be secured to the belts R¹, at suitable distances apart, to aid in carrying the stalks to the wheel.

S represents a lever, which is to be secured to the end-piece A³ of the frame, by means of a belt, or yoke, from which point it extends forward, and has its front end secured to the cross-beam A¹ of the frame.

The rear end of this lever is to have upon its side a spring, s¹, to the outer end of which a handle is attached, or upon which such handle is formed, such spring being for the purpose of entering notches formed upon a sheet of metal, or of wood, which is to be secured to the standard T, in which such lever and spring move, the arrangement of these parts being such as that when the rear end of lever S is depressed, the front end of the machine will be elevated, and thus afford the means of cutting the stalks of the corn at any desired distance from the earth.

T represents the standard above alluded to, which is to be secured to the tongue, or arm U, and is to be so arranged as to span or stride the lever S, so that as such lever is raised or depressed, the spring thereon will hold the same in position by engaging with the notches on the side of such standard.

U represents a tongue, or arm, which is to be secured to the rear end of the frame of the machine, by means of eye-bolts, or some other form of a hinge.

To the rear end of this tongue, there is secured an upright standard, U¹, which extends far enough to receive the eye-bolt, which connects its upper end with the standard, or arm U², which supports and guides the steering, or guiding-wheel U³.

Just in front of the guiding-wheel, and just in rear of the termination of the lever U, is the driver's, or operator's seat, it being so arranged that he can, at the same time, give direction to the machine, by means of the handle U⁴, upon the upper end of the arm U², and regulate the height at which the stalks shall be cut, by means of the lever S.

The part at which the horses may be attached for propelling this machine, may be just in front of the operator's seat.

V represents a wheel, having three or four radiating arms, which is to be secured to the side of the machine directly opposite the point where the apron R¹ delivers the stalks.

This wheel is constructed, in all respects, like the one above described as delivering the stalks and husks from the husking-rollers to the apron R¹. It has no driving-pulley, but its movements are regulated by means of a bell-crank lever, V¹, which is pivoted to the frame A, and has one of its arms extending inward, so as to come in contact with a cam, or projection, which is formed upon or secured to the side of the driving-wheel, or to one of the spokes thereof, in such a manner that once during each revolution of such wheel, this projection comes in contact with this arm of the lever, and carries it forward, so as to withdraw the opposite end from under one of the wings, or arms of the wheel V, and allow it to perform one or three-fourths of a revolution, and deposit the stalks which have been deposited thereon during the previous revolution of the driving-wheel.

a represents an arm, which is to be secured to the frame, there being one upon each side of the machine, they being for the purpose of holding in position the arms c, in the outer ends of which the journals of the reel turn.

b b represent standards, which are to be secured to the frame A, at a part somewhat in the rear of the cutters.

These standards are to have in their upper ends a series of holes, so that the arm c may be raised or lowered, and thus placed or held in any desired position, by means of bolts passing through such arms and standards, which arrangement is clearly shown in fig. 2.

d d represent the arms of a reel, which is to be placed in the outer ends of the arms c, where a series of holes is provided for its journals, so that it may be carried backward or forward, as occasion may require.

e e represent cross-bars, or slats, which extend from one of the arms d of the reel to the other, as shown in fig. 1, they having their outer ends curved, as shown in the same figure, for the purpose of gathering in the stalks of the corn, and guiding them to the cutters.

It should be remarked, with reference to the husking-rollers, that they are each driven by separate gear-wheels, C¹ and C¹, but the upper one has, between it and such driving-gear, a pinion of the same diameter, and having the same number of cogs, or teeth, as the one upon the roller-shaft, which intermediate gear works upon a stud attached to the jambs of frame O, and thus communicates its motion to the pinion upon the shaft of the upper roller.

To provide for a continuous motion of the husking-rollers for some time after the machine has been stopped, we fit the wheels C¹ loosely upon the shaft 4, and provide upon their inner surfaces, or upon their hubs, a ratchet-wheel and a dog, which are to be so arranged that when the machine is in motion, the wheels will be made to rotate with the shaft, but when, from any cause, it becomes necessary to stop the machine, the movement of the fly-wheels upon the husking-rollers will act, through the pinion thereon, to cause such gear-wheels to rotate upon their shaft, and thus the husking of any corn, or ears of corn, which may have been commenced when such stoppage occurred, will be completed, and the rollers be ready to receive more when the machine is again started.

To provide for throwing the husking-rollers out of and into gear with the driving-wheel, when the machine is in motion, we provide, upon the shaft of the wheel C², a clutch-coupling, one portion of which is upon the hub of such wheel, which turns freely upon such shaft, while the other portion of such clutch is to be upon a sleeve, which fits upon such shaft, and moves longitudinally thereon, but cannot rotate upon it, it being prevented by a feather in such shaft working in a spline formed in such sleeve.

The arrangement of these devices is such, that by withdrawing the rod W, shown in fig. 4, so that the rod W' shall enter one of the depressions formed on its sides, the clutch, or that portion of it to which rod W' is connected, will move away from the other portion, and thus leave the husking-rollers at rest, as well as the wheels C¹ C¹, and the shaft upon which they are carried.

When it is desired to put the above-named parts in motion again, it is only necessary for the operator to move forward the rod W, until one of its projections comes opposite the end of rod W', which will throw the projections of the clutch into contact with each other, and thus the desired object will be effected.

To facilitate this operation, the rod W is arranged upon the top of lever S, and extends back to where the operator sits.

Having thus described our invention,

What we claim, and desire to secure by Letters Patent, is—

1. Combining with a corn-harvesting machine a corn-husker, having fluted or corrugated rollers, substantially as and for the purpose set forth.

2. The within-described arrangement of the gear-wheels $C^1 C^1$, with reference to the wheel $C^2$, pinion $B^6$, driving-wheel $B^2$, and pinions N, on the husking-rollers, substantially as shown, and for the purpose set forth.

3. The arrangement of the fly-wheels upon the ends of the shafts of the husking-rollers, substantially as and for the purpose set forth.

4. The combination of the inclined planes L L with the husking-rollers.

5. The arrangement of the inclined planes L L, with reference to the apron $G^1 G^2 G^3$, substantially as shown, and for the purpose set forth.

6. The arrangement of the apron $G^1 G^2 G^3$, elevator $H H^1$, and spout, or delivery K, with reference to the receptacle I, substantially as and for the purpose set forth.

7. The combination and arrangement of the husking-rollers N N, wheel Q, and endless belt, or apron $R R^1 R^2$, substantially as and for the purpose set forth.

8. The arrangement of the wheel V, with reference to the endless belt, or apron $R R^1 R^2$, substantially as and for the purpose set forth.

9. The arrangement of the cam, or projection, over the driving-wheel, the bell-crank lever $V^1$, and depositing-wheel V, substantially as and for the purpose set forth.

10. The arrangement of the endless apron $F F^1 F^2 F^3$, with reference to the cutters and the inclined planes L L, substantially as and for the purpose set forth.

11. The construction and arrangement of the inclined planes L L and M, substantially as and for the purpose set forth.

12. The arrangement of the inclines L and M, with reference to the husking-rollers, substantially as shown, and for the purpose of guiding the stalks to the husking-rollers.

In testimony whereof, we have signed our names to this specification, in the presence of two subscribing witnesses.

JAMES H. FISHER.
CHARLES HOLCOMB.

Witnesses:
D. P. HOLLOWAY,
F. H. SPROGUE.